(12) United States Patent
Zhou et al.

(10) Patent No.: US 12,067,916 B2
(45) Date of Patent: Aug. 20, 2024

(54) DRIVING CIRCUIT AND DISPLAY PANEL

(71) Applicant: WUHAN CHINA STAR OPTOELECTRONICS TECHNOLOGY CO., LTD., Wuhan (CN)

(72) Inventors: Yongxiang Zhou, Wuhan (CN); Chao Tian, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 17/434,726

(22) PCT Filed: Jun. 1, 2021

(86) PCT No.: PCT/CN2021/097630
§ 371 (c)(1),
(2) Date: Aug. 27, 2021

(87) PCT Pub. No.: WO2022/241843
PCT Pub. Date: Nov. 24, 2022

(65) Prior Publication Data
US 2024/0021118 A1 Jan. 18, 2024

(30) Foreign Application Priority Data
May 20, 2021 (CN) .......................... 202110552959.6

(51) Int. Cl.
*G09G 3/20* (2006.01)
(52) U.S. Cl.
CPC ....... *G09G 3/20* (2013.01); *G09G 2300/0426* (2013.01); *G09G 2310/0286* (2013.01); *G09G 2320/0214* (2013.01)

(58) Field of Classification Search
CPC ............. G09G 3/20; G09G 2300/0426; G09G 2310/0286; G09G 2320/0214;
(Continued)

(56) References Cited

U.S. PATENT DOCUMENTS

2014/0043066 A1 2/2014 Yoon et al.
2017/0221441 A1* 8/2017 Gu ....................... G06F 3/04184
(Continued)

FOREIGN PATENT DOCUMENTS

CN 103474038 A 12/2013
CN 105513525 A 4/2016
(Continued)

OTHER PUBLICATIONS

International Search Report in International application No. PCT/CN2021/097630, mailed on Feb. 9, 2022.
(Continued)

*Primary Examiner* — Lunyi Lao
*Assistant Examiner* — Jarurat Suteerawongsa
(74) *Attorney, Agent, or Firm* — PV IP PC; Wei Te Chung; Zhigang Ma

(57) ABSTRACT

A driving circuit and a display panel are provided. The driving circuit includes a plurality of driving units which are cascaded. An Nth stage driving unit includes: a pull-up control module; a first bootstrap module; a pull-up module; a pull-down control module; and a first pull-down module. The driving circuit can be normally operated by input signal lines including a first clock signal line, a second clock signal line, a first power signal line, a second power signal line, and an initial signal line, so that types and a number of the input signal lines can be effectively reduced.

10 Claims, 2 Drawing Sheets

(58) Field of Classification Search
CPC .............. G09G 2310/0267; G09G 3/32; G09G 3/3208; G09G 3/3225; Y02B 20/40
See application file for complete search history.

(56) References Cited

U.S. PATENT DOCUMENTS

| | | |
|---|---|---|
| 2018/0025687 A1 | 1/2018 | Wang |
| 2019/0206291 A1 | 7/2019 | Liu |
| 2020/0035180 A1* | 1/2020 | Chen .................... G09G 3/3677 |
| 2020/0251044 A1* | 8/2020 | Lin .................... H03K 19/0019 |

FOREIGN PATENT DOCUMENTS

| | | |
|---|---|---|
| CN | 106205520 A | 12/2016 |
| CN | 106652901 A | 5/2017 |
| CN | 108172170 A | 6/2018 |
| CN | 110164391 A | 8/2019 |
| CN | 110176217 A | 8/2019 |
| CN | 110706636 A | 1/2020 |
| CN | 110767175 A | 2/2020 |
| CN | 110767176 A | 2/2020 |

OTHER PUBLICATIONS

Written Opinion of the International Searching Authority in International application No. PCT/CN2021/097630, mailed on Feb. 9, 2022.
Chinese Office Action in corresponding Chinese Patent Application No. 202110552959.6 dated Jan. 10, 2022, pp. 1-12.

* cited by examiner

DRIVING CIRCUIT AND DISPLAY PANEL

RELATED APPLICATIONS

This application is a Notional Phase of PCT Patent Application No. PCT/CN2021/097630 having international filing date of Jun. 1, 2021, which claims the benefit of priority of Chinese Patent Application No. 202110552959.6 filed on May 20, 2021. The contents of the above applications are all incorporated by reference as if fully set forth herein in their entirety.

TECHNICAL FIELD

The present disclosure relates to the display technology field, and more particularly to a driving circuit and a display panel.

BACKGROUND ART

With the rapid development of display technology, various types of display panels are widely used in various fields and scenarios, such as mobile phones, computers, TVs, displays, outdoor displays, car displays, aircraft displays and so on. The display technology can include liquid crystal display (LCD) display technology and active light-emitting display technology. For example, the active light-emitting display technology can be OLEDs, mini-LEDs, micro-LEDs and so on.

Different from the LCD, the active light-emitting display technology not only requires a row scan driving circuit, but also usually needs to be used with a driving circuit which can provide light-emitting control signals.

However, the drive circuit in the conventional technical solution often requires various different input signal lines. With the increasing of types of the input signal lines, the input signal lines occupy more space in a non-display area in a display panel, and thus it is not beneficial for implementing the narrow border of the display panel.

It should be noted that the above-mentioned introduction of the background art is only to facilitate a clear and complete understanding of the technical solutions of the present disclosure. Accordingly, it cannot be considered that the above-mentioned technical solutions are known to those skilled in the art just because it appears in the background art of the present disclosure.

Technical Problem

The present disclosure provides a driving circuit and a display panel for easing the technical problem that a driving circuit requires more input signal lines.

Technical Solution

In a first aspect, the present disclosure a driving circuit. The driving circuit includes a plurality of driving units which are cascaded. An Nth stage driving unit includes: a pull-up control module, an input terminal of the pull-up control module connected to an (N−1)th stage light-emitting control signal line or an initial signal line, and a control terminal of the control module connected to a first clock signal line; a first bootstrap module, one terminal of the first bootstrap module connected to an output terminal of the pull-up control module, and the other terminal of the first bootstrap module connected to a second clock signal line; a pull-up module, a control terminal of the pull-up module connected to the one terminal of the first bootstrap module, and an input terminal of the pull-up module connected to a first power signal line; a pull-down control module, an input terminal of the pull-own control module connected to the first power signal line, and a control terminal of the pull-down control module connected to the first clock signal line; and a first pull-down module, a control terminal of the first pull-down module connected to an output terminal of the pull-down control module, an input terminal of the first pull-down module connected to a second power signal line, and an output terminal of the pull-down module connected to an output terminal of the pull-up module to output an Nth stage light-emitting control signal, wherein N is a positive integer.

In one embodiment, the driving circuit further includes an anti-electricity leakage isolation module; an input terminal of the anti-electricity leakage isolation module is connected to the output terminal of the pull-up control module, an output terminal of the anti-electricity leakage isolation module is connected to the control terminal of the pull-up module, and a control terminal of the anti-electricity leakage isolation module is connected to the first power signal line; and wherein when a voltage level at the input terminal of the anti-electricity leakage isolation module is equal to a voltage level at the output terminal of the anti-electricity leakage isolation module, the anti-electricity leakage isolation module is in a turn-off state.

In one embodiment, the driving circuit further includes a second pull-down module; and an input terminal of the second pull-down module is connected to the second power signal line, an output terminal of the second pull-down module is connected to the control terminal of the first pull-down module, and a control terminal of the second pull-down module is connected to the control terminal of the pull-up module.

In one embodiment, the driving circuit further includes a voltage stabilizing module; and one terminal of the voltage stabilizing module is connected to the control terminal of the first pull-down module, and the other terminal of the voltage stabilizing module is connected to the second power signal line.

In one embodiment, the driving circuit further includes a first control module; and an input terminal of the first control module is connected to the first clock signal line, an output terminal of the first control module is connected to the output terminal of the pull-down control module, and a control terminal of the first control module is connected to the output terminal of the pull-up control module.

In one embodiment, the driving circuit further includes a second control module; and an input terminal of the second control module is connected to the second clock signal line, an output terminal of the second control module is connected to the control terminal of the first pull-down module, and a control terminal of the second control module is connected to the output terminal of the pull-down control module.

In one embodiment, the driving circuit further includes a second bootstrap module; and one end of the second bootstrap module is connected to the control terminal of the second control module, and the other terminal of the second bootstrap module is connected to the output terminal of the second control module.

In one embodiment, the driving circuit further includes a third pull-down module; and an input terminal of the third pull-down module is connected to the second power signal line, an output terminal of the third pull-down module is connected to the output terminal of the pull-up control module, and a control terminal of the third pull-down module is connected to the output terminal of the pull-down control module and the second clock signal line.

In one embodiment, the third pull-down module includes: a first pull-down sub-module, an output terminal of the first pull-down sub-module connected to the output terminal of the pull-up control module, and a control terminal of the pull-down sub-module connected to the second clock signal line; and a second pull-down sub-module, an output terminal of the second pull-down sub-module connected to an input terminal of the first pull-down sub-module, an input terminal of the second pull-down sub-module connected to the second power signal line, and a control terminal of the second pull-down sub-module connected to the output terminal of the pull-down control module.

In a second aspect, the present disclosure provides a driving circuit. The driving circuit includes a plurality of driving units which are cascaded. Each of the driving units includes: a first wiring; a second wiring; a third wiring; a fourth wiring; a fifth wiring; a first transistor, one of source/drain electrodes of the first transistor electrically connected to the first wiring, and a gate electrode of the first transistor connected to the second wiring; a second transistor, one of source/drain electrodes of the second transistor electrically connected to the other of the source/drain electrodes of the first transistor, and a gate electrode of the second transistor electrically connected to the third wiring; a third transistor, a gate of the third transistor electrically connected to the other of the source/drain electrodes of the second transistor, and one of source/drain electrodes of the third transistor electrically connected to the fourth wiring; a first capacitor, one terminal of the first capacitor electrically connected to the gate electrode of the third transistor, and the other terminal of the capacitor electrically connected to the fourth wiring; a fourth transistor, one of source/drain electrodes of the fourth transistor electrically connected to the third wiring, and a gate of the fourth transistor electrically connected to the second wiring; and a fifth transistor, a gate of the fifth transistor electrically connected to the other of the source/drain electrodes of the fourth transistor, one of source/drain electrodes of the fifth transistor electrically connected to the fifth wiring, and the other of the source/drain electrodes of the fifth transistor electrically connected to the other of the source/drain electrodes of the third transistor to output a corresponding light-emitting control signal.

In some embodiments, each of the driving units further includes: a second capacitor, one terminal of the second capacitor electrically connected to the gate electrode of the fifth transistor, and the other terminal of the second capacitor electrically connected to the fifth wiring.

In some embodiments, each of the driving units further includes: a third capacitor, one terminal of the third capacitor electrically connected to the other of the source/drain electrodes of the fourth transistor, and the other terminal of the third capacitor electrically connected to the gate electrode of the fifth transistor.

In some embodiments, each of the driving units further includes: a sixth transistor, a gate electrode of the sixth transistor electrically connected to the one terminal of the third capacitor, one of source/drain electrodes of the sixth transistor electrically connected to the fourth wiring, and the other of the source/drain electrodes of the sixth transistor electrically connected to the other terminal of the third capacitor.

In some embodiments, each of the driving units further includes: a seventh transistor, one of source/drain electrodes of the seventh transistor electrically connected to the fourth wiring, the other of the source/drain electrodes of the seventh transistor electrically connected to the other terminal of the third capacitor, and a gate electrode of the seventh transistor electrically connected to the gate terminal of the third transistor.

In some embodiments, each of the driving units further includes: an eighth transistor, one of source/drain electrodes of the eighth transistor electrically connected to the second wiring, the other of the source/drain electrodes of the eighth transistor electrically connected to the other of the source/drain electrodes of the fourth transistor, and a gate electrode of the eighth transistor electrically connected to the one of the source/drain electrodes of the first transistor.

In some embodiments, each of the driving units further includes: a ninth transistor, one of source/drain electrodes of the ninth transistor electrically connected to the fifth wiring, and a gate electrode of the ninth transistor electrically connected to the other of the source/drain electrodes of the fourth transistor; and a tenth transistor, one of source/drain electrodes of the tenth transistor electrically connected to the other of the source/drain electrodes of the ninth transistor, a gate electrode of the tenth transistor electrically connected to the fourth wiring, and the other of the source/drain electrodes of the tenth transistor electrically connected to the other of the source/drain electrodes of the first transistor.

In some embodiments, at least one of the first transistor, the second transistor, the third transistor, the fourth transistor, the fifth transistor, the sixth transistor, the seventh transistor, the eighth transistor, the ninth transistor, and the tenth transistor is an N-channel type thin film transistor.

In some embodiments, the second wiring is configured to transmit a first clock signal, and the fourth wiring is configured to transmit a second clock signal; when the first clock signal is at a high voltage level, the second clock signal is at a low voltage level; and the first clock signal at the low voltage level in a time sequence partially coincides the second clock signal at the low voltage level.

In some embodiments, the third wiring is configured to transmit a constant high voltage level signal, a fifth wiring is configured to transmit a constant low voltage level signal, and a voltage level of the constant high voltage level signal is greater than a voltage level of the constant low voltage level signal.

In a third aspect, the present disclosure provides a display panel, which includes the driving circuit of any one of the above-mentioned embodiments. The driving circuit is located in a non-display area of the display panel.

Advantageous Effects

In the driving circuit and the display panel provided by the present embodiment, the driving circuit can be normally operated by the input signal lines including the first clock signal line, the second clock signal line, the first power signal line, the second power signal line, and the initial signal line, so that types and a number of the input signal lines can be effectively reduced.

DETAILED DESCRIPTION OF EMBODIMENTS

To make the objectives, technical schemes, and technical effects of the present disclosure more clearly and definitely, the present disclosure will be described in details below by using embodiments in conjunction with the appending drawings. It should be understood that the specific embodiments described herein are merely for explaining the present disclosure but are not intended to limit the present disclosure.

Figure 1:
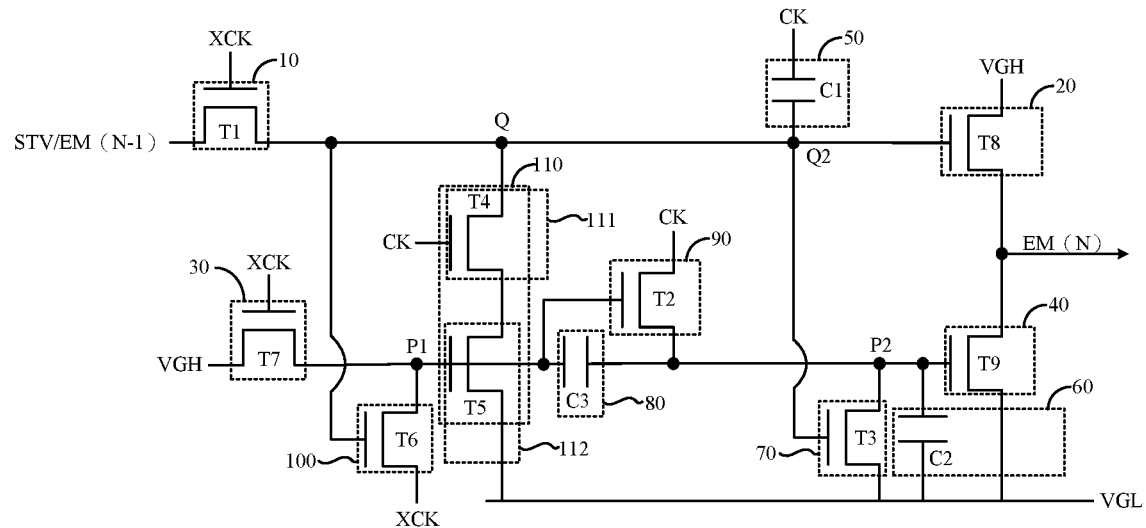
FIG. 1 illustrates a structural diagram of a driving circuit provided by one embodiment of the present disclosure.
Figure 2:
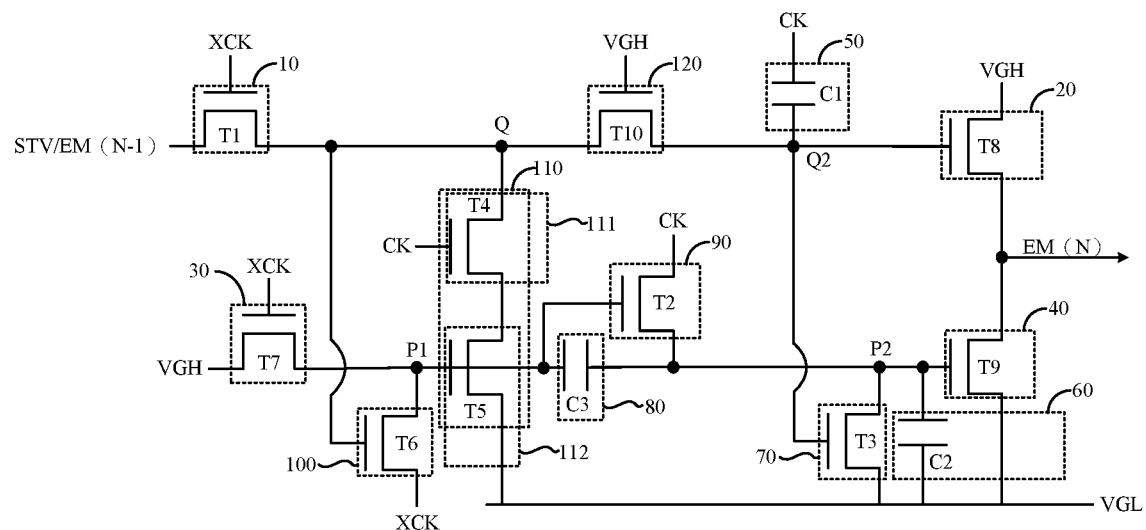
FIG. 2 illustrates another structural diagram of a driving circuit provided by one embodiment of the present disclosure.
Figure 3:
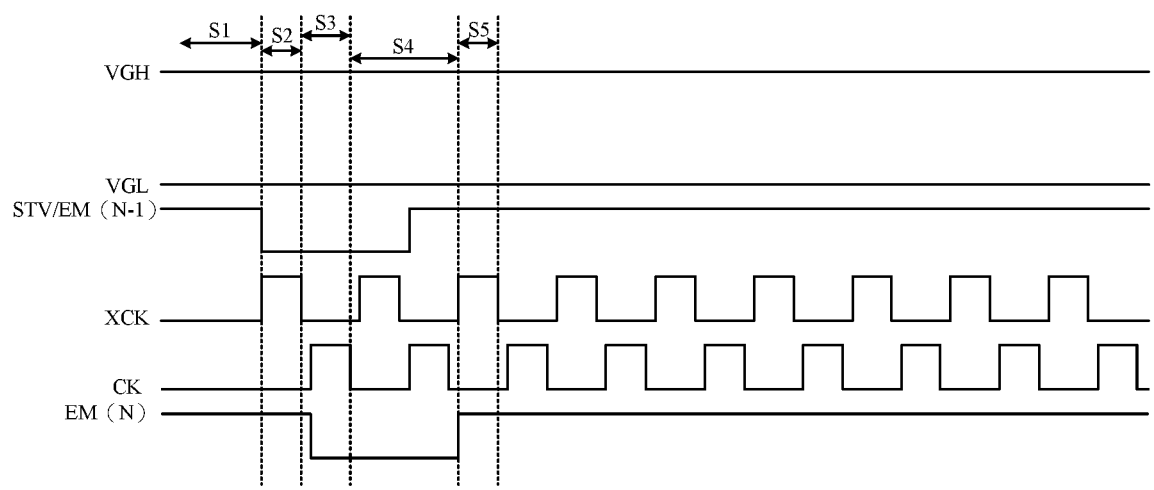
FIG. 3 illustrates a timing diagram of a driving circuit provided by one embodiment of the present disclosure.

Please refer to FIGS. 1 to 3. As shown in FIG. 1, one embodiment provides a driving circuit. The driving circuit includes a plurality of driving units which are cascaded. An Nth stage driving unit includes a pull-up control module 10, a first bootstrap module 50, a pull-up module 20, a pull-down control module 30, and a first pull-down module 40. An input terminal of the pull-up control module 10 is connected to an (N−1)th stage light-emitting control signal line or an initial signal line. A control terminal of the control module 10 is connected to a first clock signal line. One terminal of the first bootstrap module 50 is connected to an output terminal of the pull-up control module 10, and the other terminal of the first bootstrap module 50 is connected to a second clock signal line. A control terminal of the pull-up module 20 is connected to the one terminal of the first bootstrap module 50. An input terminal of the pull-up module 20 is connected to a first power signal line. An input terminal of the pull-own control module 30 is connected to the first power signal line. A control terminal of the pull-down control module 30 is connected to the first clock signal line. A control terminal of the first pull-down module 40 is connected to an output terminal of the pull-down control module 30. An input terminal of the first pull-down module 40 is connected to a second power signal line. An output terminal of the pull-down module 40 is connected to an output terminal of the pull-up module 20 to output an Nth stage light-emitting control signal EM(N), where N is a positive integer.

It can be understood that in the driving circuit provided by the present embodiment, the driving circuit can be normally operated by the input signal lines including the first clock signal line, the second clock signal line, the first power signal line, the second power signal line, and the initial signal line, so that types and a number of the input signal lines can be effectively reduced.

In one embodiment, the pull-up control module 10 includes a first thin film transistor T1. One of source/drain electrodes of the first thin film transistor T1 is electrically connected to the N−1th stage light emitting control signal line or the initial signal line. A gate electrode of the first thin film transistor T1 is connected to the first clock signal line.

It should be noted that when N is equal to 1, one of the source/drain electrodes of the first thin film transistor T1 is electrically connected to the initial signal line. When N is greater than 1, one of the source/drain electrodes of the first thin film transistor T1 is electrically connected to the N−1th stage light-emitting control signal line.

In one embodiment, the first bootstrap module 50 includes a first bootstrap capacitor C1. One terminal of the first bootstrap capacitor C1 is connected to the other of the source/drain electrodes of the first thin film transistor T1. The other terminal of the bootstrap capacitor C1 is connected to the second clock signal line.

In one embodiment, the pull-up module 20 includes a second thin film transistor T8. A gate electrode of the second thin film transistor T8 is connected to the other of the source/drain electrodes of the first thin film transistor T1. One of source/drain electrodes of the second thin film transistor T8 is connected to the first power signal line. It should be understood that when a clock signal transmitted by the second clock signal line is a high voltage level, the first bootstrap capacitor C1 can couple the gate electrode of the second thin film transistor T8 to a higher voltage level, so that the second thin film transistor T8 can be fully turned on to transmit a first power signal of the first power signal line losslessly.

In one embodiment, the pull-down control module 30 includes a third thin film transistor T7. One of source/drain electrodes of the third thin film transistor T7 is connected to the first power signal line. A gate of the third thin film transistor T7 is connected to the first clock signal line.

In one embodiment, the first pull-down module 40 includes a fourth thin film transistor T9. A gate of the fourth thin film transistor T9 is connected to the other of the source/drain electrodes of the third thin film transistor T7. One of source/drain electrodes of the fourth thin film transistor T9 is connected to the second power signal line. The other of the source/drain electrodes of the fourth thin film transistor T9 is connected to the other of the source/drain electrodes of the second thin film transistor T8 and served as an output node for outputting the Nth-level light-emitting control signal EM(N).

As shown in FIG. 2, in one embodiment, the driving circuit further includes an anti-electricity leakage isolation module 120. An input terminal of the anti-electricity leakage isolation module 120 is connected to the output terminal of the pull-up control module 10. An output terminal of the anti-electricity leakage isolation module 120 is connected to the control terminal of the pull-up module 20. A control terminal of the anti-electricity leakage isolation module 120 is connected to the first power signal line. When a voltage level at the input terminal of the anti-electricity leakage isolation module 120 is equal to a voltage level at the output terminal of the anti-electricity leakage isolation module 120, the anti-electricity leakage isolation module 120 is in a turn-off state.

The anti-electricity leakage isolation module 120 includes a fifth thin film transistor T10. One of source/drain electrodes of the fifth thin film transistor T10 is connected to the other of the source/drain electrodes of the first thin film transistor T1. The other of the source/drain electrodes of the fifth thin film transistor T10 is connected to the gate electrode of the second thin film transistor T8. A gate of the fifth thin film transistor T10 is connected to the first power signal line.

It can be understood that during the charging process of a node Q2 and a node Q, when a voltage level at the node Q2 reaches a voltage level at the node Q, that is, the voltage levels of the two are the same or similar, the fifth thin film transistor T10 is in a turn-off or a disconnection state. In this situation, even if the voltage level at the node Q2 is coupled to a higher voltage level by the second clock signal line via the first bootstrap capacitor C1, the fifth thin film transistor T10 is still in the turn-off state since the voltage level at the node Q is close to the voltage level at the first power signal. As such, the voltage level at the node Q2 is isolated from the voltage level at the node Q. The node Q2 and the node Q do not influence with each other, and it is beneficial for maintaining stability of each of the voltage levels at the node Q2 and the node Q. Furthermore, since the fifth thin film transistor T10 is in the turn-off state, electric leakage at each of the node Q2 and the node Q can be reduced. Accordingly, the voltage levels at the node Q2 and the node Q are more stable.

In one embodiment, the driving circuit further includes a second pull-down module 70. An input terminal of the second pull-down module 70 is connected to the second power signal line. An output terminal of the second pull-down module 70 is connected to the control terminal of the first pull-down module 40. A control terminal of the second pull-down module 70 is connected to the control terminal of the pull-up module 20.

The second pull-down module 70 includes a sixth thin film transistor T3. One of source/drain electrodes of the sixth thin film transistor T3 is connected to the second power signal line. The other of the source/drain electrodes of the sixth thin film transistor T3 is connected to the gate electrode of the fifth thin film transistor T10. A gate electrode of the sixth thin film transistor T3 is connected to the gate electrode of the second thin film transistor T8.

In one embodiment, the driving circuit further includes a voltage stabilizing module 60. One terminal of the voltage stabilizing module 60 is connected to the control terminal of the first pull-down module 40. The other terminal of the voltage stabilizing module 60 is connected to the second power signal line.

The voltage stabilizing module 60 includes a voltage stabilizing capacitor C2. One terminal of the voltage stabilizing capacitor C2 is connected to the gate electrode of the fourth thin film transistor T9. The other terminal of the voltage stabilizing capacitor C2 is connected to the second power signal line. It can be understood that the voltage stabilizing capacitor C2 can be configure to stabilize a voltage level of the gate electrode of the fourth thin film transistor T9.

In one embodiment, the driving circuit further includes a first control module 100. An input terminal of the first control module 100 is connected to the first clock signal line. An output terminal of the first control module 100 is connected to the output terminal of the pull-down control module 30. A control terminal of the first control module 100 is connected to the output terminal of the pull-up control module 10.

The first control module 100 includes a seventh thin film transistor T6. One of source/drain electrodes of the seventh thin film transistor T6 is connected to the first clock signal line. The other of the source/drain electrodes of the seventh thin film transistor T6 is connected to the other of the source/drain electrodes of the third thin film transistor T7. A gate of the seventh thin film transistor T6 is connected to the one of the source/drain electrodes of the first thin film transistor T1.

In one embodiment, the driving circuit further includes a second control module 90. An input terminal of the second control module 90 is connected to the second clock signal line. An output terminal of the second control module 90 is connected to the control terminal of the first pull-down module 40. A control terminal of the second control module 90 is connected to the output terminal of the pull-down control module 30.

The second control module 90 includes an eighth thin film transistor T2. One of source/drain electrodes of the eighth thin film transistor T2 is connected to the gate electrode of the fourth thin film transistor T9. The other of the source/drain electrodes of the eighth thin film transistor T2 is connected to the second clock signal line. A gate electrode of the eighth thin film transistor T2 is connected to the other of the source/drain electrodes of the third thin film transistor T7.

In one embodiment, the driving circuit further includes a second bootstrap module 80. One end of the second bootstrap module 80 is connected to the control terminal of the second control module 90. The other terminal of the second bootstrap module 80 is connected to the output terminal of the second control module 90.

The second bootstrap module 80 includes a second bootstrap capacitor C3. One terminal of the second bootstrap capacitor C3 is connected to the one of the source/drain electrodes of the eighth thin film transistor T2. The other terminal of the second bootstrap capacitor C3 is connected to the other of the source/drain electrodes of the eighth thin film transistor T2. It can be understood that the second bootstrap capacitor C3 is configured to couple a voltage level at the gate electrode of the eighth thin film transistor T2 to a higher voltage level, and thus it is beneficial for turning on the eighth thin film transistor T2 fully.

In one embodiment, the driving circuit further includes a third pull-down module 110. An input terminal of the third pull-down module 110 is connected to the second power signal line. An output terminal of the third pull-down module 110 is connected to the output terminal of the pull-up control module 10. A control terminal of the third pull-down module 110 is connected to the output terminal of the pull-down control module 30 and the second clock signal line.

In one embodiment, the third pull-down module 110 includes a first pull-down sub-module 111 and a second pull-down sub-module 112. An output terminal of the first pull-down sub-module 111 is connected to the output terminal of the pull-up control module 10. A control terminal of the pull-down sub-module 111 is connected to the second clock signal line. An output terminal of the second pull-down sub-module 112 is connected to an input terminal of the first pull-down sub-module 111. An input terminal of the second pull-down sub-module 112 is connected to the second power signal line. A control terminal of the second pull-down sub-module 112 is connected to the output terminal of the pull-down control module 30.

The first pull-down sub-module 111 includes a ninth thin film transistor T4. One of source/drain electrodes of the ninth thin film transistor T4 is connected to the other of the source/drain electrodes of the first thin film transistor T1. A gate electrode of the thin film transistor T4 is connected to the second clock signal line.

The second pull-down sub-module 112 includes a tenth thin film transistor T5. One of source/drain electrodes of the tenth thin film transistor T5 is connected to the other of the source/drain electrodes of the ninth thin film transistor T4. The other of the source/drain electrodes of the tenth thin film transistor T5 is connected to the second power signal line. A gate electrode of the tenth thin film transistor T5 is connected to the other of the source/drain electrodes of the third thin film transistor T7.

It should be noted that the first clock signal line is configured to transmit a first clock signal XCK. The second clock signal line is configured to transmit a second clock signal CK. The first power signal line is configured to transmit a first power signal. The second power signal line is configured to transmit a second power signal. The initial signal line is configured to transmit an initial signal STY. The first clock signal XCK is different from the second clock signal CK. A voltage level of the first power signal is different from a voltage level of the second power signal.

Based on this, at least one of the first thin film transistor T1, the second thin film transistor T8, the third thin film transistor T7, the fourth thin film transistor T9, the fifth thin film transistor T10, the sixth thin film transistor T3, the seventh thin film transistor T6, the eighth thin film transistor T2, the ninth thin film transistor T4, and the tenth thin film transistor T5 can be but not limited to, an N-channel type thin film transistor. Correspondingly, the voltage level of the first power signal is higher than the voltage level of the second power signal. The voltage level of the first power signal can be configured to turn on a corresponding thin film transistor, and the voltage level of the second power signal can be configured to turn off a corresponding thin film transistor.

It should be noted that in one embodiment, a first wiring can be configured to transmit the initial signal STV or an (N−1)th stage light-emitting control signal EM(N−1), a second wiring can be configured to transmit the first clock signal XCK, a third wiring can be configured to transmit a constant high voltage level signal (that is, the first power signal), a fourth wiring can be configured to transmit the second clock signal CK, and a fifth wiring can be configured to transmit a constant low voltage level signal (that is, the second power signal). A first transistor can be used as another expression of the first thin film transistor T1. A second transistor can be used as another expression of the fifth thin film transistor T10. A third transistor can be used as another expression of the second thin film transistor T8. A fourth transistor can be used as another expression of the third thin film transistor T7. A fifth transistor can be used as another expression of the fourth thin film transistor T9. A sixth transistor can be used as another expression of the eighth thin film transistor T2. A seventh transistor can be used as another expression of the sixth thin film transistor T3. An eighth transistor can be used as another expression of the seventh thin film transistor T6. A ninth transistor can be used as another expression of the tenth thin film transistor T5. A tenth transistor can be used as another expression of the ninth thin film transistor T4. A first capacitor can be used as another expression of the first bootstrap capacitor C1. A second capacitor can be used as another expression of the voltage stabilizing capacitor C2. A third capacitor can be used as another expression of the second bootstrap capacitor C3.

As shown in FIG. 3, in summary, the Nth stage driving unit is used as an example. When N is equal to 1, an operation process of the driving unit in the above-mentioned embodiment is described in detail as follows.

In a first operation stage S1, the initial signal STV is maintained at the voltage level of the first power signal, that is, the high voltage level VGH. The first clock signal XCK is at the voltage level of the second power signal, that is, the low voltage level VGL. The second clock signal CK is at the low voltage level VGL. At this time, the voltage level at the gate electrode of the second thin film transistor T8 can be maintained by the first bootstrap capacitor C1, so that the second thin film transistor T8 is in the turn-on state, and the Nth-stage light-emitting control signal EM(N) can be maintain to output the high voltage level VGH. As such, a self-luminous pixel circuit is controlled to be in a light-emitting stage.

In a second operation stage S2, the initial signal STV is changed from the high voltage level VGH to the low voltage level VGL. At this time, the first clock signal XCK is the high voltage level VGH. The first thin film transistor T1 is turned on, and the voltage level at the node Q becomes the low voltage level VGL. The second thin film transistor T8 is turned off. At this time, the third thin film transistor T7 is turned on, and a voltage level at a node P1 is maintained at the high voltage level VGH. Then, the eighth thin film transistor T2 is turned on, and the second clock signal CK is at the low voltage level VGL. A voltage level at a node P2 is at the low voltage level VGL, and the fourth thin film transistor T9 is turned off. Therefore, at this time, the voltage level of the N-th stage light-emitting control signal EM(N) is not changed and is still maintained at the high voltage level VGH.

In a third operation stage S3, the initial signal STV is still at the low voltage level VGL, and the voltage level at the node Q is still maintained at the low potential VGL. At this time, the second clock signal CK becomes the high voltage level VGH. Since the voltage level of the second bootstrap capacitor C3 is maintained, the eighth thin film transistor T2 is turned on. The voltage level at the node P2 is pulled up to the high voltage level VGH, and the fourth thin film transistor T9 is turned on. At this time, the Nth stage light-emitting control signal EM(N) is at the low voltage level VGL.

In a fourth operation stage S4, at least one of the initial signal STV and the first clock signal XCK is at the low voltage level VGL, so the output terminal of the first thin film transistor T1 is at the low voltage level VGL. The voltage level at the node Q is still at the low voltage level VGL. The Nth stage light-emitting control signal EM(N) is still maintained at the low voltage level VGL.

In a fifth operation stage S5, the initial signal STV and the first clock signal XCK are simultaneously changed to the high voltage level VGH. Therefore, the voltage level at the node Q is pulled up to the high voltage level VGH, and the second thin film transistor T8 is turned on. The Nth stage light-emitting control signal EM(N) is at the high voltage level VGH.

It should be noted that when N is greater than or equal to 2, the initial signal STV can be replaced with the (N−1)th stage light-emitting control signal EM(N−1). The rest operations can be referred to the above-mentioned descriptions.

It can be understood that in one embodiment, at least one of the first thin film transistor T1, the second thin film transistor T8, the third thin film transistor T7, the fourth thin film transistor T9, the fifth thin film transistor T10, the sixth thin film transistor T3, and the seventh thin film transistor of the thin film transistor T6, the eighth thin film transistor T2, the ninth thin film transistor T4, and the tenth thin film transistor T5 can also be a P-channel type thin film transistor. Correspondingly, it is necessary to adjust the voltage levels of the above-mentioned input signals to be opposite voltage levels. For example, the voltage level of the first power signal is lower than the voltage level of the second power signal. The voltage level of the first power signal can be configured to turn on a corresponding thin film transistor, and the voltage level of the second power signal can be configured to turn off a corresponding thin film transistor.

It can be understood that the driving circuit in any one of the above-mentioned embodiments can be kept to be turned off when a row scan driving circuit writes data signals, so that a pixel circuit can normally write the data signals for compensation. In most time, the driving circuit can be kept to be turned on to implement emission of the pixel circuit.

One embodiment provides a display panel, which includes the driving circuit in at least one of the above-mentioned embodiments. The driving circuit is located in a non-display area of the display panel.

It should be understood that in the display panel provided by the present embodiment, the driving circuit can be normally operated by the input signal lines including the first clock signal line, the second clock signal line, the first power signal line, the second power signal line, and the initial signal line, so that types and a number of the input signal lines can be effectively reduced. As such, space occupied in the non-display area in the display panel is decreased, and it is beneficial for implementing the narrow border of the display panel.

It should be understood that those skilled in the art can make equivalent replacements or variations according to the technical solutions and inventive concepts of the present disclosure. All the variations or replacements shall fall with the scope of the appended claims.

What is claimed is:

1. A driving circuit, comprising a plurality of driving units which are cascaded, wherein an Nth stage driving unit comprises:
    a pull-up control module, an input terminal of the pull-up control module connected to an (N−1)th stage light-emitting control signal line or an initial signal line, and a control terminal of the control module connected to a first clock signal line;
    a first bootstrap module, one terminal of the first bootstrap module connected to an output terminal of the pull-up control module, and the other terminal of the first bootstrap module connected to a second clock signal line;
    a pull-up module, a control terminal of the pull-up module connected to the one terminal of the first bootstrap module, and an input terminal of the pull-up module connected to a first power signal line;
    a pull-down control module, an input terminal of the pull-down control module connected to the first power signal line, and a control terminal of the pull-down control module connected to the first clock signal line; and
    a first pull-down module, a control terminal of the first pull-down module connected to an output terminal of the pull-down control module, an input terminal of the first pull-down module connected to a second power signal line, and an output terminal of the pull-down module connected to an output terminal of the pull-up module to output an Nth stage light-emitting control signal, wherein N is a positive integer.

2. The driving circuit of claim 1, wherein the driving circuit further comprises an anti-electricity leakage isolation module;
    an input terminal of the anti-electricity leakage isolation module is connected to the output terminal of the pull-up control module, an output terminal of the anti-electricity leakage isolation module is connected to the control terminal of the pull-up module, and a control terminal of the anti-electricity leakage isolation module is connected to the first power signal line; and
    wherein when a voltage level at the input terminal of the anti-electricity leakage isolation module is equal to a voltage level at the output terminal of the anti-electricity leakage isolation module, the anti-electricity leakage isolation module is in a turn-off state.

3. The driving circuit of claim 1, wherein the driving circuit further comprises a second pull-down module; and
    an input terminal of the second pull-down module is connected to the second power signal line, an output terminal of the second pull-down module is connected to the control terminal of the first pull-down module, and a control terminal of the second pull-down module is connected to the control terminal of the pull-up module.

4. The driving circuit of claim 3, wherein the driving circuit further comprises a voltage stabilizing module; and
    one terminal of the voltage stabilizing module is connected to the control terminal of the first pull-down module, and the other terminal of the voltage stabilizing module is connected to the second power signal line.

5. The driving circuit of claim 1, wherein the driving circuit further comprises a first control module; and
    an input terminal of the first control module is connected to the first clock signal line, an output terminal of the first control module is connected to the output terminal of the pull-down control module, and a control terminal of the first control module is connected to the output terminal of the pull-up control module.

6. The driving circuit of claim 5, wherein the driving circuit further comprises a second control module; and
    an input terminal of the second control module is connected to the second clock signal line, an output terminal of the second control module is connected to the control terminal of the first pull-down module, and a control terminal of the second control module is connected to the output terminal of the pull-down control module.

7. The driving circuit of claim 6, wherein the driving circuit further comprises a second bootstrap module; and
    one end of the second bootstrap module is connected to the control terminal of the second control module, and the other terminal of the second bootstrap module is connected to the output terminal of the second control module.

8. The driving circuit of claim 1, wherein the driving circuit further comprises a third pull-down module; and
    an input terminal of the third pull-down module is connected to the second power signal line, an output terminal of the third pull-down module is connected to the output terminal of the pull-up control module, and a control terminal of the third pull-down module is connected to the output terminal of the pull-down control module and the second clock signal line.

9. The driving circuit of claim 8, wherein the third pull-down module comprises:
    a first pull-down sub-module, an output terminal of the first pull-down sub-module connected to the output terminal of the pull-up control module, and a control terminal of the pull-down sub-module connected to the second clock signal line; and
    a second pull-down sub-module, an output terminal of the second pull-down sub-module connected to an input terminal of the first pull-down sub-module, an input terminal of the second pull-down sub-module connected to the second power signal line, and a control terminal of the second pull-down sub-module connected to the output terminal of the pull-down control module.

10. A display panel, comprising the driving circuit of claim 1.

* * * * *